United States Patent
Rowe et al.

(10) Patent No.: US 6,169,248 B1
(45) Date of Patent: Jan. 2, 2001

(54) SWITCHGEAR ASSEMBLIES WITH MOLDED SUPPORT MOUNTING BUS BARS EXTENDING THROUGH BARRIERS BETWEEN SIDE-BY-SIDE CABINETS

(75) Inventors: Neal Edward Rowe, Asheville; William Edward Wilkie, II, Fletcher; Steven Dale Walker, Arden; John Stewart Bartholomew, Hendersonville, all of NC (US)

(73) Assignee: Eaton Corporation, Cleveland, OH (US)

( * ) Notice: Under 35 U.S.C. 154(b), the term of this patent shall be extended for 0 days.

(21) Appl. No.: 09/188,480

(22) Filed: Nov. 9, 1998

(51) Int. Cl.[7] ...................................................... H02G 5/00
(52) U.S. Cl. ..................... 174/50; 174/72 B; 174/71 B; 174/70 B
(58) Field of Search ..................................... 174/50, 17 R, 174/72 B, 71 B, 70 B, 99 B, 99 R; 220/3.92, 3.94, 4.02

(56) References Cited

U.S. PATENT DOCUMENTS

| | | | |
|---|---|---|---|
| 2,930,020 | * | 3/1960 | Powell .................................. 339/64 |
| 4,921,191 | * | 5/1990 | Herschler et al. ..................... 248/70 |
| 5,213,518 | * | 5/1993 | Weidler ................................ 439/211 |
| 5,530,205 | * | 6/1996 | Parks et al. ......................... 174/99 B |

* cited by examiner

Primary Examiner—Dean A. Reichard
(74) Attorney, Agent, or Firm—Martin J. Moran

(57) ABSTRACT

The cross buses extending through side-by-side cabinets in a switchgear assembly are mounted on the metal cabinet frames by supports having a molded body with a bus bar mounting surface laterally spaced from a support mounting surface to form a gap between the bus bar and the metal frame. A planar barrier inserted between the cabinets has a cutout aligned with this gap. The molded support further has a barrier surface which extends across the gap and blocks the cutout. The barrier surfaces of supports mounted on side-by-side cabinets abut and parallel flanges on the molded bodies adjacent the barrier surfaces form grooves in which the planar barrier is clamped.

8 Claims, 6 Drawing Sheets

SWITCHGEAR ASSEMBLIES WITH MOLDED SUPPORT MOUNTING BUS BARS EXTENDING THROUGH BARRIERS BETWEEN SIDE-BY-SIDE CABINETS

BACKGROUND OF THE INVENTION

1. Field of the Invention

This invention relates to low voltage electric power distribution apparatus such as switchgear assemblies in which a plurality of cabinets housing electric power switching devices are mounted side-by-side with a set of common bus bars extending through them. In particular, it relates to supports for bus bars extending transversely through barriers between side-by-side cabinets.

2. Background Information

Switchgear assemblies include electrical switching apparatus for electric power distribution systems mounted in metal cabinets. Such electrical switching apparatus can include circuit breakers and network protectors which provide protection, disconnect switches for isolating parts of the distribution system, and transfer switches for connecting the distribution system to alternative power sources. The electrical apparatus can also include instrumentation such as metering equipment. Switchgear operating at voltages up through 600 volts are categorized as low voltage switchgear.

It is common in such low voltage switchgear to mount a plurality of cabinets each housing electrical power distribution apparatus side-by-side with a common cross bus extending transversely through and serving all of the cabinets. The cabinets are fabricated with metal frames. Applicable codes require that barriers be provided between side-by-side cabinets housing circuit breakers to reduce the likelihood that arcs could propagate along the cross bus from cabinet to cabinet. Often times, bus conductor profiles and their associated sorts make it difficult to effectively achieve this requirement due to the geometry involved. Small gaps are often produced which makes it cumbersome, and in some cases impossible, to shield these areas. For instance, the bus bars must be spaced from the metal frame which supports them to provide the required electrical isolation. Also, the supports must be sufficiently robust to withstand the sizeable magnetic forces produced by short circuits. The barriers which are slid between adjacent cabinets have cutouts to accommodate the bus bar and this offset. This produces gaps which have remained unsealed.

There is a need therefore, for improvement in switchgear assemblies, and in particular, in the arrangements for mounting the cross bus and for interfacing with the barriers between adjacent cabinets.

SUMMARY OF THE INVENTION

This need and others is satisfied by the invention which is directed to switchgear assemblies in which a plurality of cabinets having metal frames are mounted side-by-side with planar insulative barriers extending at least partially between the metal frames of adjacent cabinets. The switchgear assembly further includes at least one bus bar extending transversely through at least the two adjacent cabinets. A support for the bus bar comprises a molded body having a support mounting surface and a bus bar mounting surface spaced from the support mounting surface. First fasteners secure the molded body with the support mounting surface bearing against the metal frame of one of the cabinets. Second fasteners secure the bus bar to the bus bar mounting surface of the molded body with the bus bar spaced by a gap from the metal frame to which the molded body is secured. The planar barrier has a cutout aligned with this gap and through which the bus bar extends into the second cabinet. The molded body further has a barrier surface which extends across the gap between the bus bar and the metal frame and blocks the cutout in the barrier. The molded body preferably has flanges projecting adjacent the barrier surface which overlap and bear against the planar barrier adjacent the cutout. The support mounting surface and the bus bar mounting surface form parallel planes with the barrier surface of the molded body substantially perpendicular to both the support mounting surface and the bus bar mounting surface.

Preferably, the support mounting surface and the bus bar mounting surface of the molded body are offset in their respective parallel planes and the molded body has a first recess behind the support mounting surface in which the first fasteners are seated and a second recess adjacent the first recess and behind the bus bar mounting surface in which the second fasteners are seated. A partition separates the first and second recesses and therefore provides electrical isolation between the first and second fasteners. Preferably, a wall of the first recess also forms the barrier surface.

An additional bus bar support is mounted to the metal frame of the adjacent cabinet by third fastener means. Fourth fastener means secure the bus bar to the bus bar mounting surface of the additional bus bar support. The barrier surfaces of the two bus bar supports confront each other through the cutout. The flanges on the two bus bar supports overlap opposite sides of the planar barrier and are recessed relative to the barrier surfaces to form grooves in which the planar barrier is received. The invention also embraces the mounting support as described.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
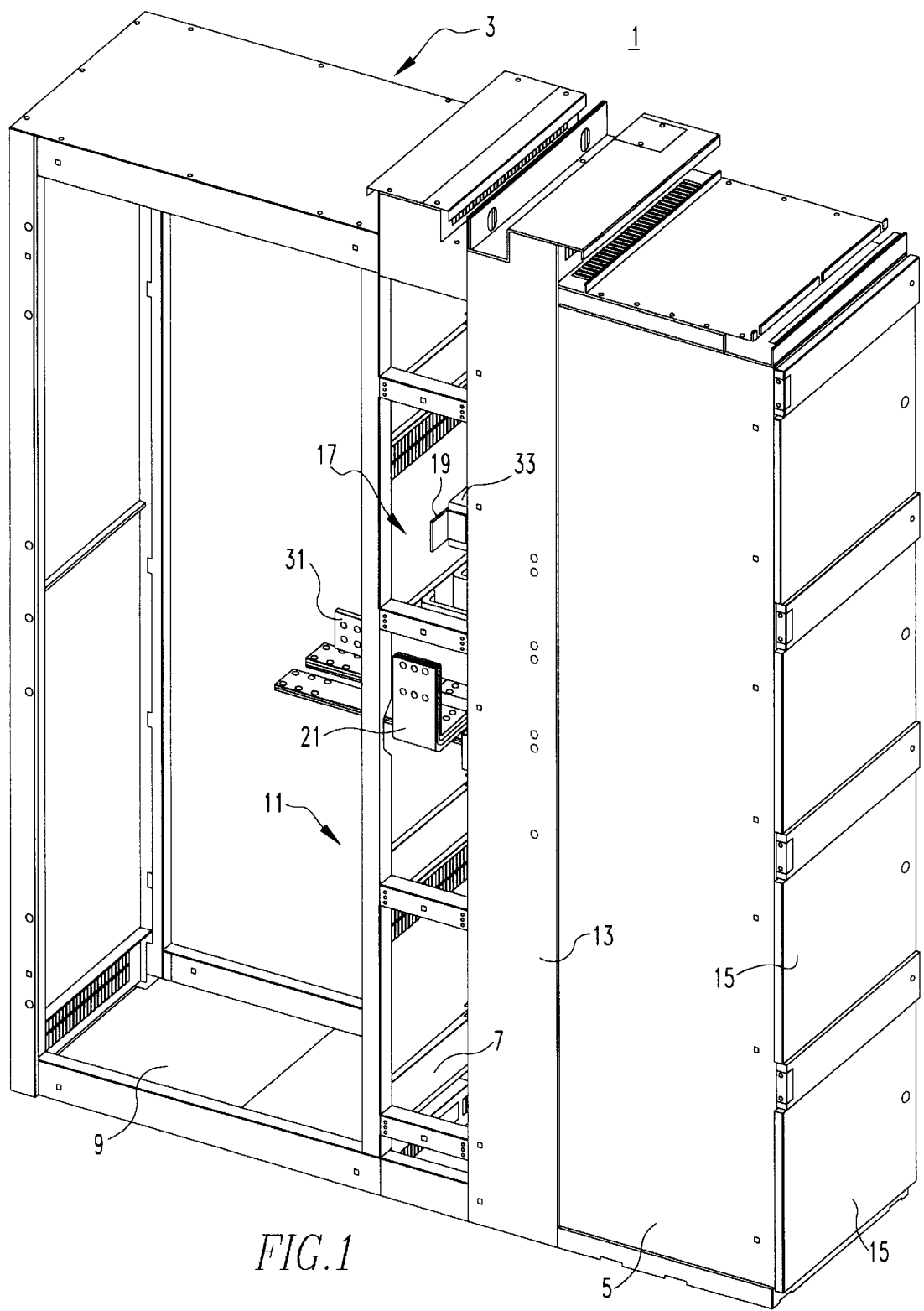
FIG. 1 is an isometric view of a switchgear assembly in accordance with the invention.

FIG. 1 illustrates a switchgear assembly 1 which includes a cabinet 3 having a forward compartment 5, a middle compartment 7 and a rear compartment 9. The cabinet 3 includes a metal frame 11. This metal frame includes a metal panel 13 extending vertically over the forward half of the middle compartment 7.

Figure 2:
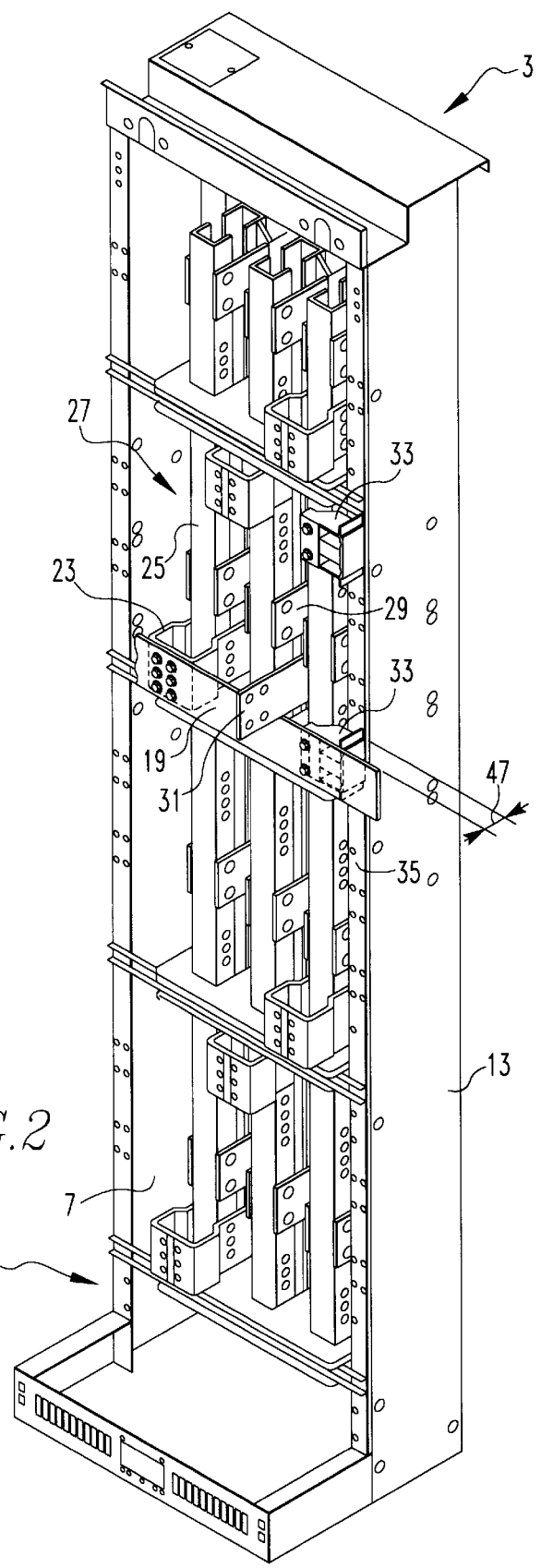
FIG. 2 is an isometric view of a portion of the switchgear assembly of FIG. 1 illustrating the mounting of a transverse cross bar in accordance with the invention.
Figure 3:
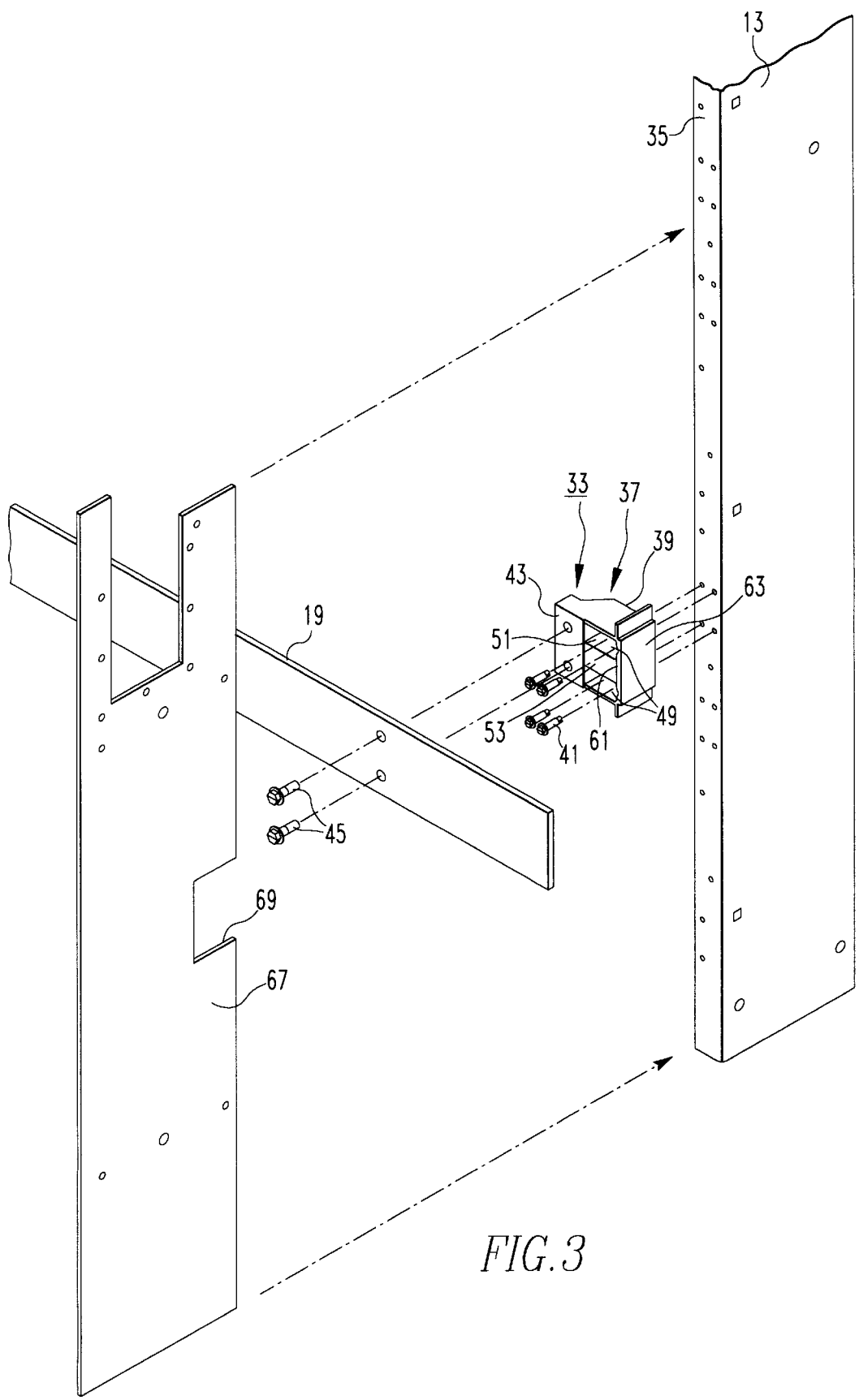
FIG. 3 is an exploded fragmentary view of the switchgear assembly illustrating mounting of a bus bar utilizing the bus bar support in accordance with the invention and showing the relationship of the planar barrier between cabinets.

The forward compartment 5 houses the electrical switching apparatus such as a number of circuit breakers stacked vertically within the front compartment 5 and accessible through front doors 15. A cross bus 17 which includes phase conductors 19 (only one shown) and a neutral conductor 21 extend transversely through the middle compartment 7. As best seen in FIG. 2, the phase conductors 19 (again only one shown) are connected by taps 23 to corresponding conductors called risers 25 in a vertical bus 27. These risers 25 are connected by stabs 29 to the circuit breakers mounted in the forward compartment 5. The other side of the circuit breakers are connected to runbacks 31 which extend through the metal compartment 7 into the rear compartment 9 where they are connected to cabling which exits the cabinet 3 for connection to a distribution system. The cross bus 17 is also connected into the distribution system.

In addition to being supported by the taps 23, the phase conductors 19 of the cross bus are also supported by bus bar supports 33 secured to the flanges 35 on the metal panel 13 forming part of the metal frame 11. Referring to FIGS. 3–7, the bus bar supports 33 have an electrically insulative molded body 37. This molded body 37 has a flat support mounting surface 39 which bears against and is secured to the flanges 35 by first fasteners in the form of self-tapping screws 41. On an opposite face of the molded body 37 is a flat bus bar mounting surface 43. The bus bar 19 is secured flat against this bus bar mounting surface 43 by second fasteners in the form of bolts 45. The support mounting surface 39 and bus bar mounting surface 43 form parallel planes. The thickness of the molded body 37 forms a gap 47 between the flange 35 and the bus bar 19.

The bus bar mounting surface 43 and the support mounting surface 39 are offset in their respective parallel planes so that they are not in alignment along imaginary axis perpendicular to their planes so that isolation can be provided for the fasteners 41 and 45. The body 37 is molded with a pair of recesses 49 behind the support mounting surface 39. Two pair of the screws 41 are seated in each of the recesses 49. The recesses 49 are separated by side walls 51 and cross wall 53 which perform two functions. First they give rigidity to the molded body 37 which is important in resisting magnetic forces generated by short circuits. In addition, they also reduce the bulk of the molded body 37 by providing another recess 55 from the support mounting surface 39.

The molded body 37 also has a recess 57 behind the bus mounting surface 43 into which the bolts 45 extend. A partition 59 isolates the bolts 45 from the screws 41. An end wall 61 of the molded body forms side walls for the recesses 49 and 55 and also forms a barrier surface 63 which extends across the gap 47.

Figure 4:
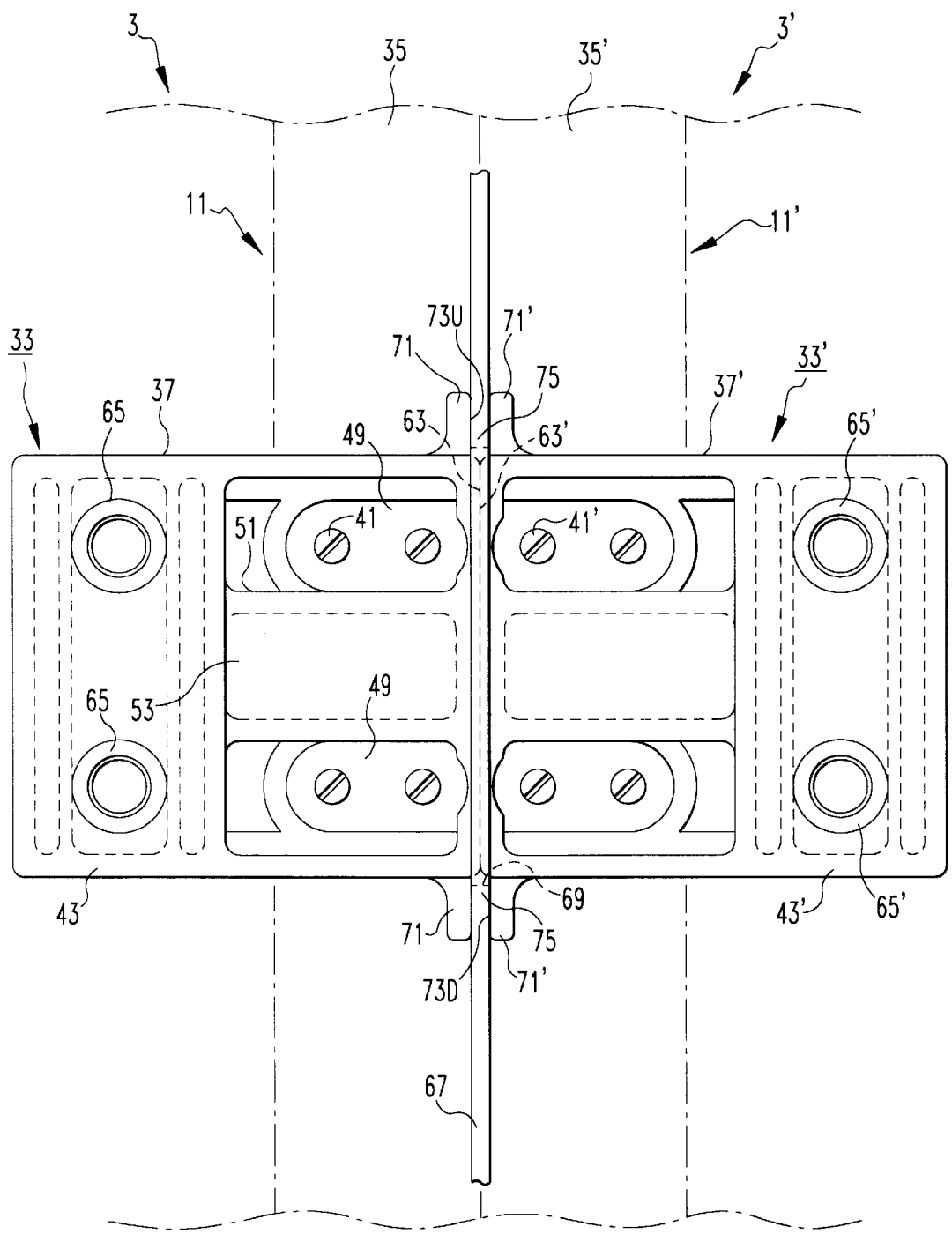
FIG. 4 is a fragmentary elevation view illustrating a pair of confronting bus bar mounting supports in accordance with the invention with the bus bar removed for clarity.
Figure 5:
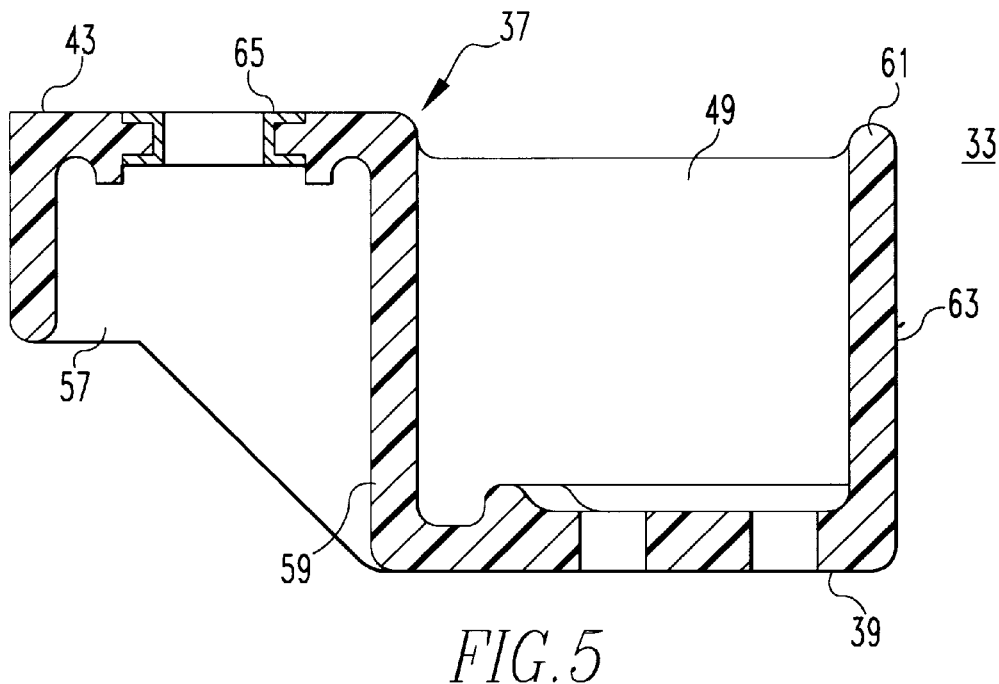
FIG. 5 is a sectional view through a bus bar support in accordance with the invention taken along the line 5—5 in FIG. 3.
Figure 6:
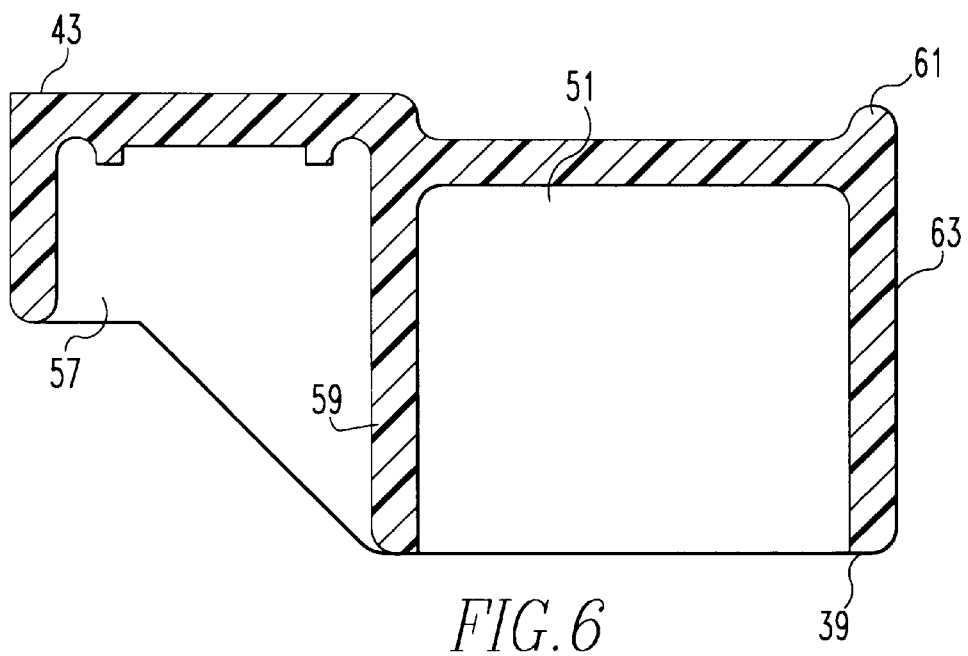
FIG. 6 is another cross-section taken along the line 6—6 in FIG. 3.
Figure 7:
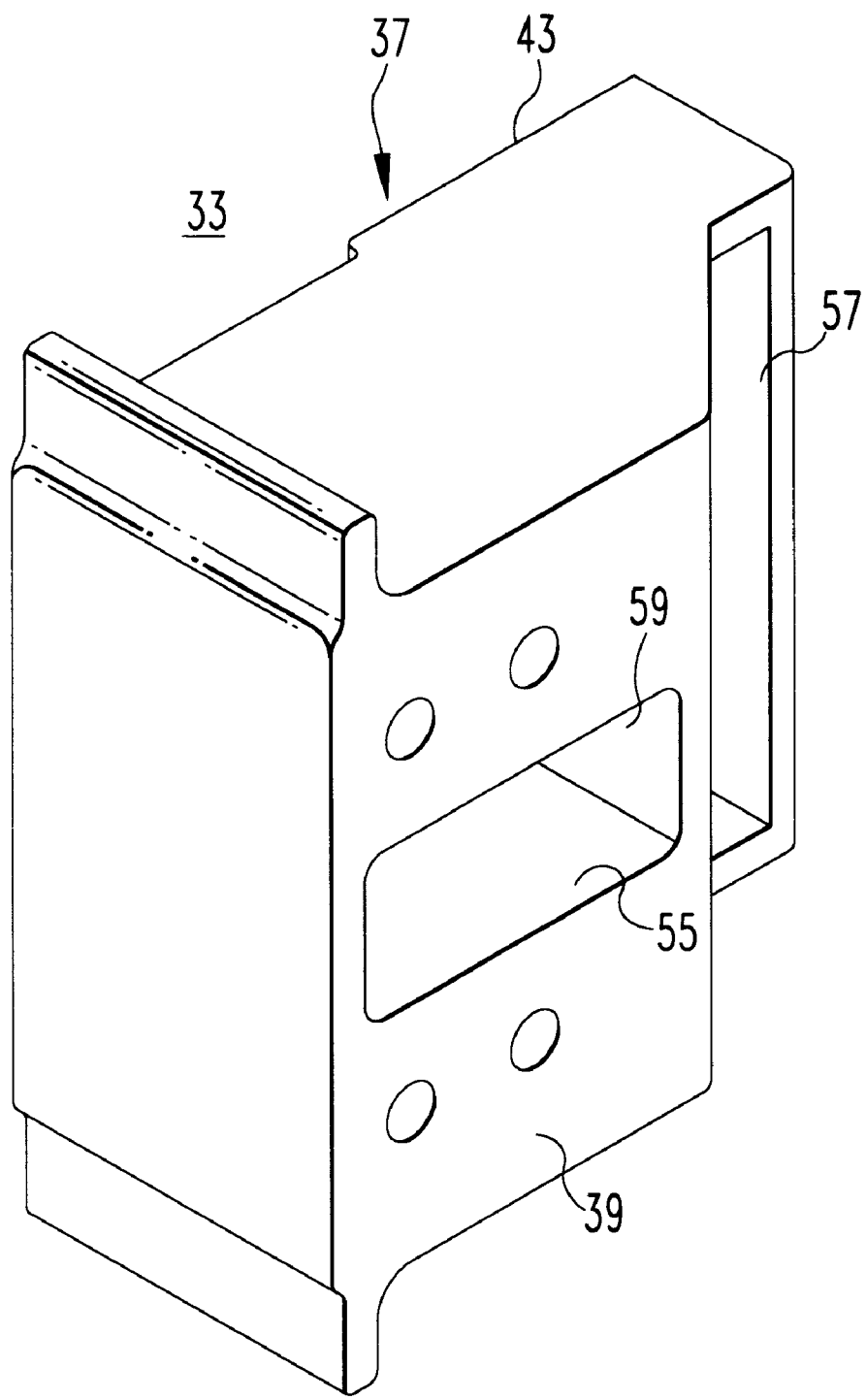
FIG. 7 is an isometric view of the bus bar mounting support viewed from the side mounting against the cabinet.

FIG. 4 illustrates schematically two metal cabinets 3 and 3' mounted side-by-side with their metal flanges 35 and 35' co-planar. An additional bus bar support 33'is secured to the flange 35' by screws 41' with the barrier surfaces 63 and 63' confronting each other. The cross bus bar (not shown in FIG. 4 for clarity) is secured against the bus bar mounting surfaces 43 and 43' by bolts which engage the threaded inserts 65 and 65'.

An electrically insulative planar barrier 67 is inserted between the frames 11 and 11' of the cabinets 3 and 3' from the rear. This planar barrier 67 has a cutout 69 which accommodates the bus bar 19 as the barrier seats up against the flanges 35 and 35A. In prior switchgear assemblies, the gap 47 formed by the offset between the bus bar 19 and the metal cabinet frame 11 and 11' was not filled. It can be seen that in the present invention, that this cutout is blocked by the barrier surfaces 63 and 63'.

It will also be noted that the molded bodies 37 and 37' have integral flanges 71 and 71' extending upward and downward adjacent the barrier surfaces 63 and 63'. These flanges 71 and 71' are recessed from the barrier surfaces 63 and 63' to form upwardly facing horizontal grooves 73U and downwardly facing horizontal grooves 73D in which edges 75 of the planar barrier are received so that the barrier is laterally fixed by the confronting bus bar supports.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A switchgear assembly comprising:
    a plurality of side-by-side cabinets each having a metal frame;
    a planar barrier extending at least partially between said metal frames of two adjacent ones of said side-by-side cabinets;
    at least one bus bar extending transversely through at least said two adjacent ones of said side-by-side cabinets;
    at least one bus bar support comprising a molded body having a support mounting surface and a bus bar mounting surface laterally spaced from said support mounting surface, first fasteners securing said molded body with said support mounting surface bearing against said metal frame of one of said two adjacent ones of said side-by-side cabinets, and second fasteners securing said at least one bus bar to said bus bar mounting surface of said molded body with said at least one bus bar spaced by a gap from said metal frame to which said molded body is secured, said planar barrier having a cutout aligned with said gap and through which said at least one bus bar extends, and said molded body having a barrier surface which extends across said gap and blocks said cutout;
    wherein said molded body has flanges projecting adjacent said barrier surface and which overlap and bear against said planar barrier adjacent said cutout; and
    wherein said support mounting surface and said bus bar mounting surface of said molded body form parallel planes.

2. The switchgear assembly of claim 1 wherein said barrier surface of said molded body is substantially perpendicular to both said support mounting surface and said bus bar mounting surface.

3. The switchgear assembly of claim 1 wherein said support mounting surface and said bus bar mounting surface of said molded body are offset in their respectively parallel planes, and said molded body has a first recess in which said first fasteners are seated, and a second recess adjacent said first recess in which said second fasteners are seated, and a partition separating said first and second recesses.

4. The switchgear assembly of claim 3 wherein said barrier surface of said molded body is substantially perpendicular to both said support mounting surface and said bus bar mounting surface and said molded body having a wall forming said barrier surface and also defining one wall of said first recess.

5. A switchgear assembly comprising:

a plurality of side-by-side cabinets each having a metal frame;

a planar barrier extending at least partially between said metal frames of two adjacent ones of said side-by-side cabinets;

at least one bus bar extending transversely through at least said two adjacent ones of said side-by-side cabinets;

at least one bus bar support comprising a molded body having a support mounting surface and a bus bar mounting surface laterally spaced from said support mounting surface, first fasteners securing said molded body with said support mounting surface bearing against said metal frame of one of said two adjacent ones of said side-by-side cabinets, and second fasteners securing said at least one bus bar to said bus bar mounting surface of said molded body with said at least one bus bar spaced by a gap from said metal frame to which said molded body is secured, said planar barrier having a cutout aligned with said gap and through which said at least one bus bar extends, and said molded body having a barrier surface which extends across said gap and blocks said cutout; and an additional bus bar support having a support mounting surface, a bus bar mounting surface and a barrier surface, third fasteners securing said additional bus bar support to said metal frame of the other of said two adjacent ones of said side-by-side cabinets, with said barrier surfaces of said at least one and said additional bus bar supports confronting through said cutout, and fourth fasteners securing said at least one bus bar to said bus bar mounting surface of said additional bus bar support.

6. The switchgear assembly of claim 5 wherein said molded bodies of said at least one bus bar support and said additional bus bar support have flanges adjacent said confronting barrier surfaces which overlap opposite sides of said planar barrier.

7. The switchgear assembly of claim 6 wherein said flanges on said molded bodies of said at least one bus bar support and said additional bus bar support are recessed relative to said barrier surfaces to form grooves in which said planar barrier is received.

8. The switchgear assembly of claim 7 wherein said flanges on said molded bodies of said at least one bus bar support and said additional bus bar support include flanges extending upward to form an upward facing groove and downward to form a downward facing groove in which said planar barrier is received.

* * * * *